(12) United States Patent
Gumpoltsberger (10) Patent No.: US 7,597,645 B2
(45) Date of Patent: Oct. 6, 2009

(54) MULTI-SPEED TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 419 days.

(21) Appl. No.: 11/704,876

(22) Filed: Feb. 9, 2007

(65) Prior Publication Data

US 2008/0015078 A1    Jan. 17, 2008

(30) Foreign Application Priority Data

Feb. 14, 2006  (DE) ................. 10 2006 006 621

(51) Int. Cl.
*F16H 3/62* (2006.01)
(52) U.S. Cl. .................................... 475/276
(58) Field of Classification Search ................. 475/275, 475/276
See application file for complete search history.

(56) References Cited

U.S. PATENT DOCUMENTS

| 4,395,925 A | 8/1983 | Gaus |
| 5,106,352 A | 4/1992 | Lepelletier |
| 6,139,463 A | 10/2000 | Kasuya et al. |
| 6,558,287 B2 | 5/2003 | Hayabuchi et al. |
| 6,572,507 B1 | 6/2003 | Korkmaz et al. |
| 6,634,980 B1 | 10/2003 | Ziemer |
| 6,860,831 B2 | 3/2005 | Ziemer |
| 6,962,549 B2 * | 11/2005 | Dreibholz et al. ........... 475/284 |
| 7,018,319 B2 | 3/2006 | Ziemer |
| 7,104,915 B2 * | 9/2006 | Tiesler et al. ............... 475/286 |
| 7,485,067 B2 * | 2/2009 | Park .......................... 475/276 |
| 2008/0103012 A1 * | 5/2008 | Kim ........................... 475/275 |
| 2009/0124449 A1 * | 5/2009 | Seo et al. .................... 475/276 |

FOREIGN PATENT DOCUMENTS

| DE | 29 36 969 | 4/1981 |
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |

* cited by examiner

*Primary Examiner*—Dirk Wright
(74) *Attorney, Agent, or Firm*—Davis & Bujold, P.L.L.C.

(57) ABSTRACT

The transmission with one reverse and seven forward gears has input and output shafts, three planetary gear sets (P1, P2, P3), six shafts, and six shifting elements. The input shaft couples the ring gear of set (P1) and detachably couples shaft (5), which couples the spider of set (P3) and detachably couples the output shaft, which couples the ring gear of set (P2). Shaft (3) couples the ring gear of the set (P3) and the carrier of set (P2) and detachably couples the housing (G). Shaft (4) couples the sun gear of set (P2), and detachably couples the housing (G) and shaft (6), which couples the carrier of set (P1) and the sun gear of set (P3). The sun gear of set (P1) is fixed to the housing (G). Either the output shaft detachably couples shaft (3), shaft (5) detachably couples shaft (4), or shaft (3) detachably couples shaft (4).

23 Claims, 5 Drawing Sheets

Fig. 1

| | 1. | 2. | 3. | 4. | 5. | 6. | 7. | R1. |
|---|---|---|---|---|---|---|---|---|
| i_G: | 4.03 | 2.29 | 1.46 | 1.00 | 0.85 | 0.71 | 0.58 | -3.09 |
| phi: | 7.01 | 1.76 | 1.56 | 1.46 | 1.18 | 1.20 | 1.23 | -0.77 |
| |03| | x | | | | | | | x |
| |04| | | x | | | | | x | |
| |15| | | | | x | x | x | x | |
| |23| | | | | | x | | | |
| |25| | x | x | x | x | | | | |
| |46| | | | x | | | x | | x |

| | 1. | 2. | 3. | 4. | 5. | 6. | 7. | R1. |
|---|---|---|---|---|---|---|---|---|
| i_G: | 4.03 | 2.29 | 1.46 | 1.00 | 0.79 | 0.71 | 0.58 | -3.09 |
| phi: | 7.01 | 1.76 | 1.56 | 1.46 | 1.27 | 1.12 | 1.23 | -0.77 |
| |03| | x | | | | | | | x |
| |04| | | x | | | | | x | |
| |15| | | | | x | x | x | x | |
| |45| | | | x | | x | | | |
| |25| | x | x | x | x | | | | |
| |46| | | | | | | | x | x |

| | 1. | 2. | 3. | 4. | 5. | 6. | 7. | R1. |
|---|---|---|---|---|---|---|---|---|
| i_G: | 4.03 | 2.29 | 1.46 | 1.00 | 0.85 | 0.71 | 0.58 | -3.09 |
| phi: | 7.01 | 1.76 | 1.56 | 1.46 | 1.18 | 1.20 | 1.23 | -0.77 |
| \|03\| | x | | | | | | | x |
| \|04\| | | x | | | | | x | |
| \|15\| | | | | x | x | x | x | |
| \|34\| | | | x | | x | | | |
| \|25\| | x | x | x | x | | | | |
| \|46\| | | | | | | x | | x |

MULTI-SPEED TRANSMISSION

This application claims priority from German Application Serial No. 10 2006 006 621.9 filed Feb. 14, 2006.

FIELD OF THE INVENTION

The invention concerns a multi-speed transmission of planetary construction, in particular an automatic transmission for a motor vehicle.

BACKGROUND OF THE INVENTION

According to the state of the art, automatic transmissions, in particular for motor vehicles, comprise planetary gear sets, which are shifted by means of friction elements or shifting elements, such as possibly clutches and brakes, and are usually connected to a starting element that is subject to a slip effect and is selectively provided with a lockup clutch, such as a hydrodynamic torque converter, or a fluid clutch.

One transmission such as this is disclosed in EP 0 434 525 A1. It comprises essentially an input shaft and an output shaft, which are arranged parallel to each other, a double planetary gear set arranged concentrically with the output shaft, and five shifting elements in the form of three clutches and two brakes, whose selective lockup, in pairs, determines the various gear ratios between the input shaft and the output shaft. The transmission comprises a front-mounted gear set and two power paths, so that six forward speeds can be achieved by selectively engaging the five shifting elements in pairs.

Two clutches are required for the transmission of torque in the first power path from the front-mounted gear set to two elements of the double planetary gear set. These are arranged in the direction of power flow essentially behind the front-mounted gear set in the direction of the double planetary gear set. Another clutch is provided in the second power path, which detachably connects the path to another element of the double planetary gear set. The clutches are arranged in such a way that the inner disk carrier forms the output.

A compact multi-speed transmission of planetary construction, in particular for a motor vehicle, which comprises two planetary gear sets and one front-mounted gear set, as well as three clutches and two brakes, is also known from U.S. Pat. No. 6,139,463. In this known multi-speed transmission, two clutches C-1 and C-3 are provided in a first power path for transmitting torque from the front-mounted gear set to the two planetary gear sets. Here, the outer disk carrier and/or the cylinder or piston and pressure compensating side of the clutch C-3 is connected to a first brake B-1. The inner disk carrier of the third clutch C-3 is also connected to the cylinder or piston and pressure compensating side of the first clutch C-1, wherein the inner disk carrier of the first clutch C-1 is arranged on the output side and is connected to a sun gear of the third planetary gear set.

From DE 199 49 507 A1 of the applicant, a multi-speed transmission is additionally known, in which two non-shiftable front-mounted gear sets are provided on the input shaft, which generate two rotational speeds on the output side, which, in addition to the rotational speed of the input shaft, can be optionally shifted to a shiftable double planetary gear set acting on the output shaft by selectively engaging the shifting elements that are used in such a way that in order to shift from one gear to the next higher or lower gear, only one shifting element of the two just actuated shifting elements has to be activated or deactivated.

From DE 199 12 480 A1 an automatically shiftable motor vehicle transmission is known, which comprises three single carrier planetary gear sets as well as three brakes and two clutches for shifting six forward gears and one reverse gear, and one input shaft and one output shaft. The automatically shiftable motor vehicle transmission is configured in such a way that the input shaft is connected directly to the sun gear of the second planetary gear set and the input shaft can be connected to the sun gear of the first planetary gear set by way of the first clutch and/or to the carrier of the first planetary gear set via the second clutch. In addition or as an alternative, the sun gear of the first planetary gear set can be connected to the housing of the transmission by way of the first brake and/or the carrier of the first planetary gear set, can be connected to the housing by way of the second brake and/or the sun gear of the third planetary gear set can be connected to the housing by way of the third brake.

Furthermore, from DE 102 13 820 A1 an automatic multi-speed transmission is known, which comprises a first input path T1 of a first gear ratio; an input path T2, which has a greater gear ratio than the input path T1; a planetary gear set with four elements, wherein the four elements are arranged in a direction of power flow in the order of a first element, a second element, a third element, and a fourth element; a clutch C-2 transmits rotation of the input path T2 to the first element S3; a clutch C-1 transmits rotation from the input path T2 to the fourth element S2; a clutch C-4 transmits rotation from the input path T1 to the first element; a clutch C-3 transmits rotation from the input path T1 to the second element C3; a brake B-1 induces engagement of the fourth element; a brake B-2 induces engagement of the second element; and an output element is coupled to the third element R3.

Within the scope of DE 101 15 983 A1 of the applicant, a multi-speed transmission is described, which comprises an input shaft connected to a front-mounted gear set, an output shaft connected to a rear-mounted gear set, and a maximum of seven shifting elements, whose selective shifting allows at least seven forward gears to be shifted without a range shift. The front-mounted gear set is comprised of a front-mounted planetary gear set or a maximum of two non-shiftable front-mounted planetary gear sets that are coupled to the first front-mounted planetary gear set, wherein the rear-mounted gear set is designed as a two-carrier, four-shaft transmission with two shiftable, rear-mounted planetary gear sets, and has four free shafts. The first free shaft of this two-carrier, four-shaft transmission is connected to the first shifting element; the second free shaft is connected to the second and third shifting elements; the third free shaft is connected to the fourth and fifth shifting elements; and the fourth free shaft is connected to the output shaft. For a multi-speed transmission with a total of six shifting elements, it is proposed according to the invention to additionally connect the third free shaft or the first free shaft of the rear-mounted gear set to a sixth shifting element. For a multi-speed transmission with a total of seven shifting elements, it is proposed according to the invention to additionally connect the third free shaft to a sixth shifting element D' and to additionally connect the first free shaft to a seventh shifting element.

A multi-speed transmission with at least seven gears is furthermore described within the scope of DE 101 15 987 of the applicant. This transmission consists of, in addition to the input shaft and the output shaft, a non-shiftable front-mounted gear set and a shiftable rear-mounted gear set in the form of a two-carrier, four-shaft transmission. The front-mounted gear set consists of a first planetary gear set, which, in addition to the input rotational speed of the input shaft, offers a second rotational speed, which can be optionally applied on a rear-mounted gear set. The rear-mounted gear set consists of two shiftable, planetary gear sets, which can shift into at least seven gears using the six shifting elements, thus forming two power paths. Range shifts are always advantageously prevented during each shifting operation. A 9-gear multi-speed transmission is furthermore known from DE 29 36 969; it comprises eight shifting elements and four gear sets.

Automatically shiftable motor vehicle transmissions of planetary construction have been described multiple times in the prior art and are subject to continuous development and improvement. These transmissions should have a sufficient number of forward gears as well as one reverse gear and a gear ratio that is well suited for motor vehicles, with a high overall transmission ratio spread and favorable progressive ratios. They should further provide a high starting gear ratio in the forward direction and should contain a direct gear, and should be suitable for use in both passenger vehicles and commercial vehicles. In addition, these transmissions should have a low design complexity, in particular a small number of shifting elements, and should prevent double-shifting during sequential shifting, so that only one shifting element is changed when shifting into defined gear groups.

SUMMARY OF THE INVENTION

It is the object of the invention to propose a multi-speed transmission of the kind described above, in which the design complexity is simplified and the efficiency in the main travel gears is also improved, in terms of drag and gearing losses. A low torque should act on the shifting elements and planetary gear sets, and the rotational speeds of the shafts, shifting elements, and planetary gear sets should also be kept as low as possible with the multi-speed transmission of the invention. The number of gears as well as the spread of transmission ratios should also be increased, so that seven forward gears and at least one reverse gear can be advantageously realized. The transmission of the invention should furthermore be suited for any vehicle design, especially for a front-transverse arrangement.

A multi-speed transmission of planetary construction is accordingly proposed, which comprises an input shaft and an output shaft, which are arranged in a housing. At least three planetary gear sets, which in the following will be referred to as the first, second and third planetary gear sets, at least six rotatable shafts, which in the following will be referred to as the input shaft, output shaft, third, fourth, fifth and sixth shafts, as well as at least six shifting elements, comprising brakes and clutches, whose selective engagement induces different gear ratios between the input shaft and the output shaft, so that preferably seven forward gears and one reverse gear can be realized.

The input shaft is permanently connected to the ring gear of the first planetary gear set and can be releasably connected by way of a clutch to the fifth shaft, which is permanently connected to the carrier of the third planetary gear set and can be releasably connected by way of a further clutch to the output shaft, which is permanently connected to the ring gear of the second planetary gear set, wherein the third shaft is permanently connected to the ring gear of the third planetary gear set and the carrier of the second planetary gear set and can be coupled to the housing by way of a brake.

The fourth shaft is permanently connected to the sun gear of the second planetary gear set, can be coupled to the housing by way of a brake, and can be releasably connected by way of a clutch to the sixth shaft, which is permanently connected to the carrier of the first planetary gear set and the sun gear of the third planetary gear set, wherein the sun gear of the first planetary gear set is connected to the housing in a slip free manner.

According to the invention, either the output shaft can be releasably connected to the third shaft by way of a clutch, or the fifth shaft can be releasably connected by way of a clutch to the fourth shaft, or the third shaft can be releasably connected to the fourth shaft by way of a clutch.

The configuration of the multi-speed transmission according to the invention induces suitable gear ratios, particularly for passenger vehicles, as well as a significant increase in the overall transmission ratio spread of the multi-speed transmission, whereby an improvement in driving comfort and a significant decrease in fuel consumption are brought about.

The design complexity is furthermore considerably reduced with the multi-speed transmission according to the invention due to the low number of shifting elements, preferably two brakes and four clutches. It is advantageously possible with the multi-speed transmission according to the invention to start driving with a hydrodynamic converter, a hydrodynamic clutch, an external starting clutch, or also with other suitable external starting elements. It is also conceivable to enable a starting procedure with a starting element that is integrated into the transmission. A shifting element, which is actuated in the first forward gear and in the reverse gear, is preferably suitable.

The multi-speed transmission according to the invention furthermore achieves good efficiency in the main travel gears with respect to drag and gearing losses.

A low torque is furthermore present in the shifting elements and in the planetary gear sets of the multi-speed transmission, whereby the wear is advantageously reduced in the multi-speed transmission. The low torque enables a correspondingly small dimension, whereby the required installation space and corresponding costs are reduced. Aside from this, low rotational speeds are also present at the shafts, the shifting elements, and the planetary gear sets.

Moreover, the transmission according to the invention is configured in such a way that adaptation to different drive train configurations, both in the power flow direction and also from a spatial point of view, is made possible.

BRIEF DESCRIPTION OF THE DRAWINGS

The invention will be explained in more detail in the following based on the examples represented in the drawings, wherein.

DETAILED DESCRIPTION OF THE DRAWINGS

Figure 1:
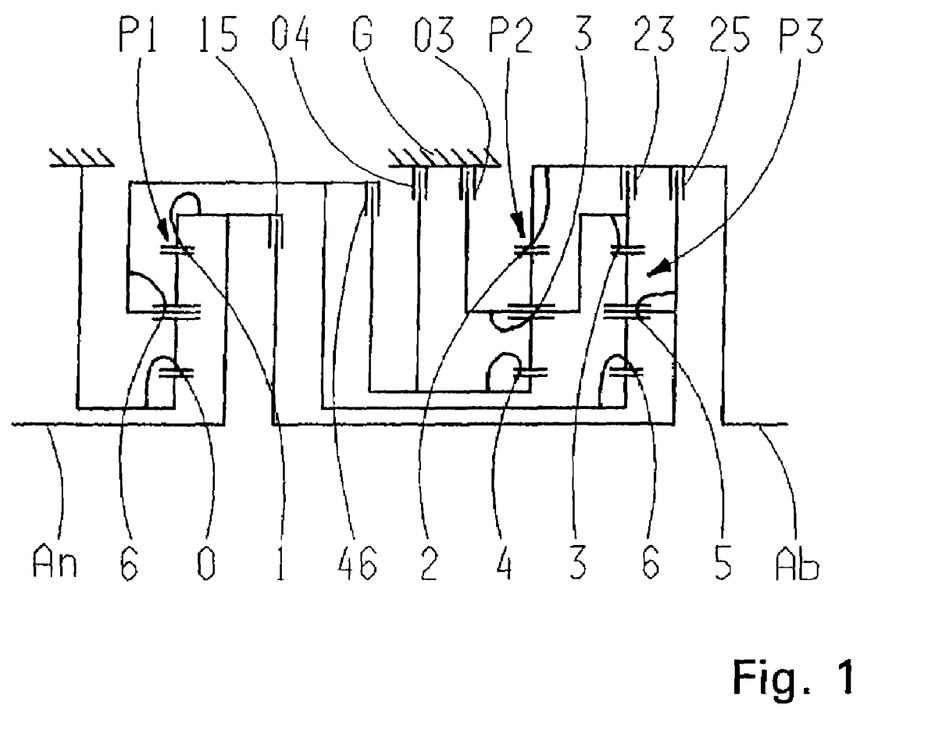
FIG. 1 shows a schematic view of a preferred embodiment of a multi-speed transmission according to the invention.

In FIG. 1, a multi-speed transmission according to the invention is depicted, comprising an input shaft 1 (An) and an output shaft 2 (Ab), which are arranged in a housing G. Three planetary gear sets P1, P2, and P3 are provided, which are preferably designed as negative planetary gear sets and are arranged in the sequence P1, P2, P3 in the axial direction.

As is shown in FIG. 1, only six shifting elements, namely two brakes 03, 04 and four clutches 15, 23, 25 and 46, are provided. Selective engagement of preferably seven forward gears and one reverse gear can be realized with these shifting elements. The multi-speed transmission according to the invention has a total of six rotatable shafts, namely the shafts 1, 2, 3, 4, 5, and 6.

In the multi-speed transmission of FIG. 1, it is provided according to the invention that input is applied by means of the shaft 1, which is permanently connected to the ring gear of the first planetary gear set P1 and can be releasably connected by way of a clutch 15 to the shaft 5, which is permanently connected to the carrier of the third planetary gear set P3 and can be releasably connected by way of a clutch 25 to the output shaft 2, which is permanently connected to the ring gear of the second planetary gear set P2. The shaft 3 is also permanently connected to the ring gear of the third planetary gear set P3 and to the carrier of the second planetary gear set P2, and can be coupled to the housing G by way of the brake 03. The shaft 4 is permanently connected to the sun gear of the second planetary gear set P2, can be coupled to the housing G by way of the brake 04, and can be releasably connected by way of the clutch 46 to the shaft 6, which is permanently connected to the carrier of the first planetary gear set P1 and to the sun gear of the third planetary gear set P3. According to the invention, the sun gear of the first planetary gear set P1 is connected to the housing G (shaft 0) in a slip free manner. The output shaft 2 can also be releasably connected to the shaft 3 by way of a clutch 23.

Within the scope of the depicted embodiment, the clutches 23 and 25, viewed axially, are arranged in the sequence 23, 25 and can have a common outer disk carrier as disk clutches.

The spatial arrangement of the shifting elements can be freely selected and is limited only by the dimensions and the outer shape.

Figure 2:
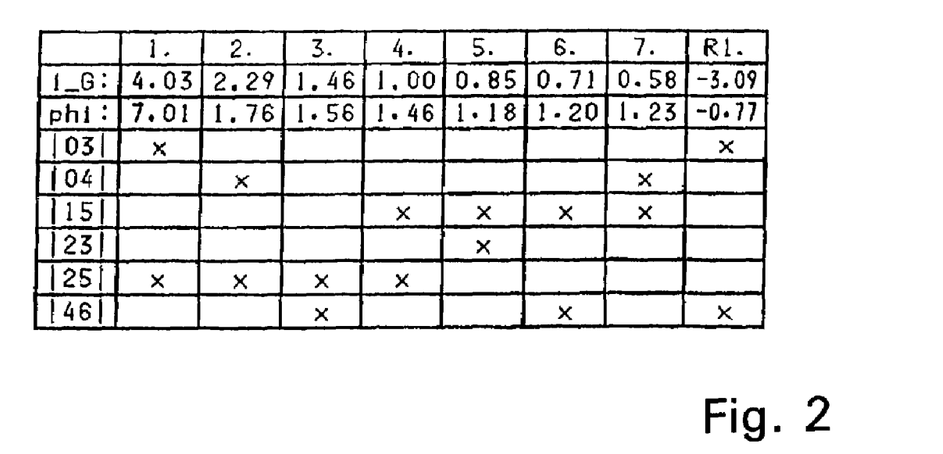
FIG. 2 shows an exemplary schematic shifting diagram of the multi-speed transmission of FIG. 1 according to the invention.

In FIG. 2 an exemplary schematic shifting diagram of the multi-speed transmission of FIG. 1 according to the invention is depicted. Two shifting elements are engaged for each gear. The schematic shifting diagram shows, as an example, the respective gear ratios i of the individual gear ratios and the progression ratios phi to be determined therefrom. It can also be seen in the schematic shifting diagram that double shifting or range shifts are prevented in sequential shifting operations, since two adjoining gears jointly utilize one shifting element.

The first gear is defined by engagement of the brake 03 and the clutch 25, the second gear is defined by engagement of the brake 04 and the clutch 25, and the third gear is defined by engagement of the clutches 25 and 46. In addition, the fourth gear is defined by engagement of the clutch 15 and the clutch 25, the fifth gear is defined by engagement of the clutches 15 and 23, the sixth gear is defined by engagement of the clutch 15 and the clutch 46, and the seventh gear is defined by engagement of the brake 04 and the clutch 15. As can be seen in the schematic shifting diagram, the reverse gear is defined by engagement of the brake 03 and the clutch 46. It is also possible to realize the third gear by engagement of the clutches 23 and 46 or 23 and 25.

A startup is possible according to the invention with an integrated shifting element (IAK), for which the brake 03 is particularly suitable, which is required in both the first gear and in the reverse gear. Different gear progressions can also be achieved with the same transmission diagram, depending on the shifting logic, so that a variation specifically adapted to an application and/or vehicle is made possible.

Figure 3:
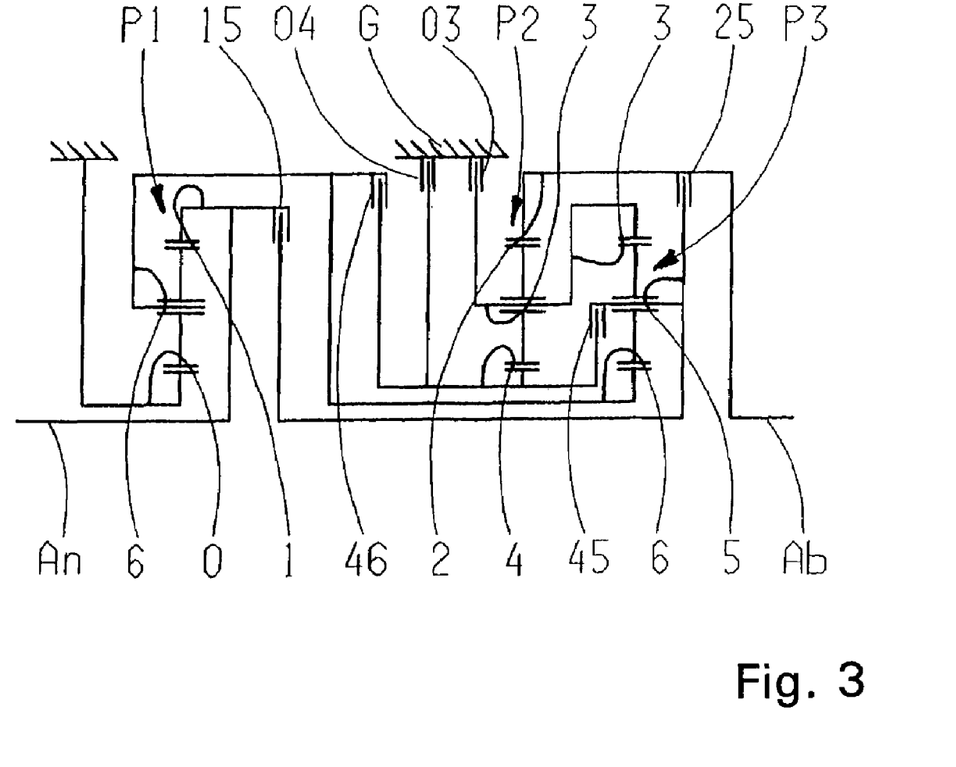
FIG. 3 shows a schematic view of another preferred embodiment of a multi-speed transmission according to the invention.

The exemplary embodiment shown in FIG. 3 differs from the embodiment according to FIG. 1 in that the shaft 5 can be releasably coupled to the shaft 4 by way of a clutch 45, wherein the releasable connection between the shafts 2 and 3 is eliminated.

Figure 4:
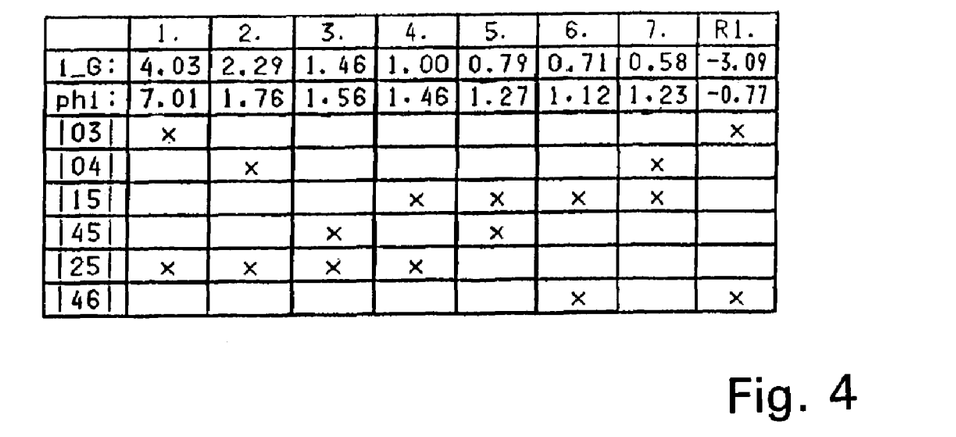
FIG. 4 shows an exemplary schematic shifting diagram of the multi-speed transmission of FIG. 3 according to the invention.

The corresponding schematic shifting diagram is depicted in FIG. 4. The first gear is defined by engagement of the brake 03 and the clutch 25, the second gear is defined by engagement of the brake 04 and the clutch 25, and the third gear is defined by engagement of the clutches 25 and 45. In addition, the fourth gear is defined by engagement of the clutch 15 and the clutch 25, the fifth gear is defined by engagement of the clutches 15 and 45, the sixth gear is defined by engagement of the clutch 15 and the clutch 46, and the seventh gear is defined by engagement of the brake 04 and the clutch 15. As can be seen in the schematic shifting diagram of FIG. 3, the reverse gear is defined by engagement of the brake 03 and the clutch 46. It is also possible to realize the third gear by engaging the clutches 25 and 46 or 45 and 46.

Figure 5:
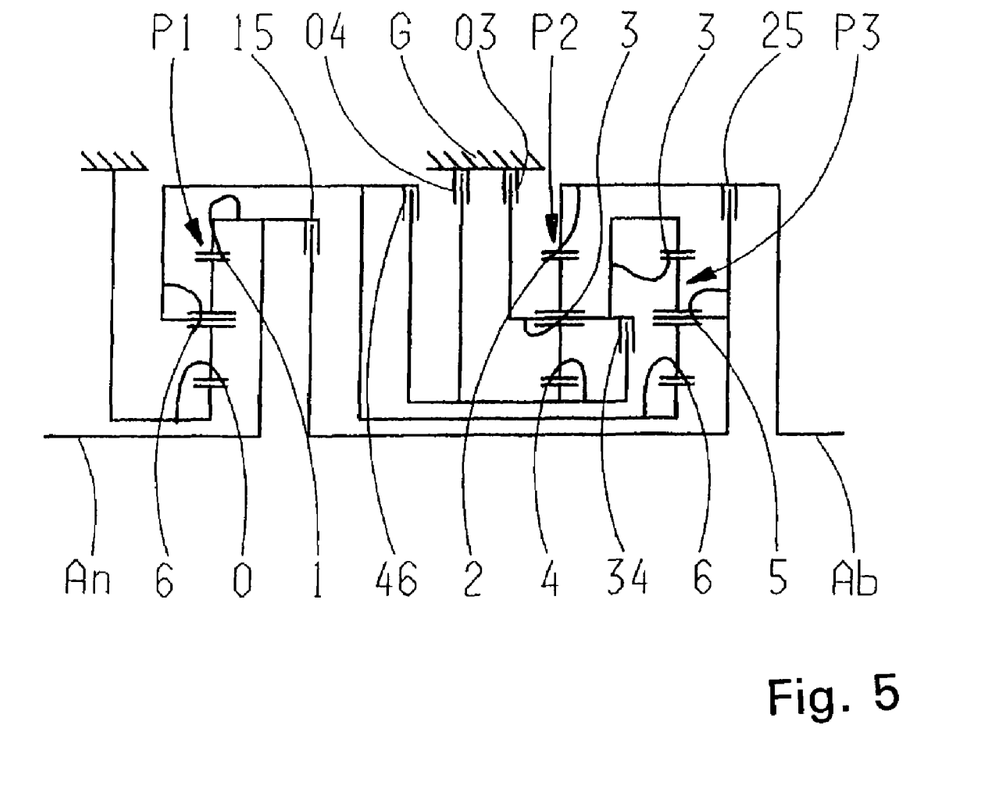
FIG. 5 shows a schematic view of another preferred embodiment of a multi-speed transmission according to the invention.

The exemplary embodiment shown in FIG. 5 differs from the embodiment according to FIG. 1 in that the shaft 3 can be releasably coupled to the shaft 4 by way of a clutch 34, wherein the releasable connection between the shafts 2 and 3 is eliminated.

Figure 6:
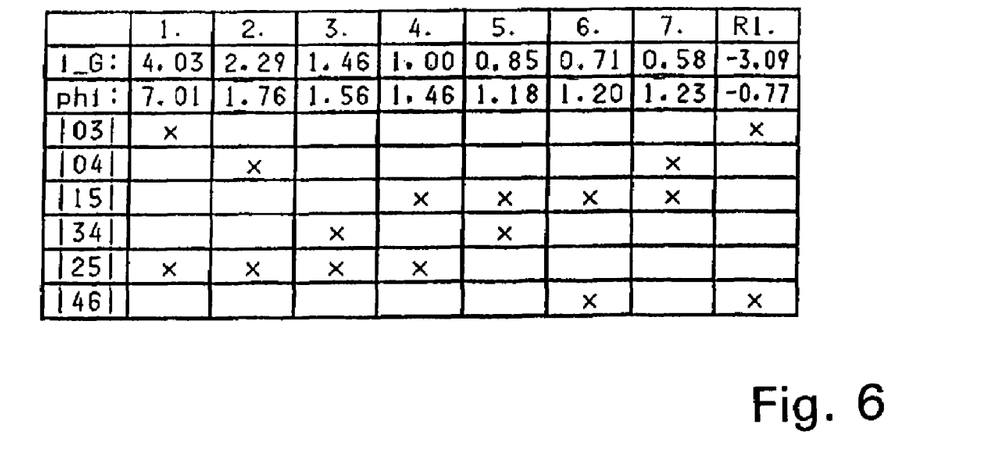
FIG. 6 shows an exemplary schematic shifting diagram of the multi-speed transmission of FIG. 5 according to the invention.

The corresponding schematic shifting diagram is depicted in FIG. 6 and corresponds to the schematic shifting diagram according to FIG. 4, with the difference that the clutch 45 is replaced by the clutch 34. The first gear is defined by engagement of the brake 03 and the clutch 25, the second gear is defined by engagement of the brake 04 and the clutch 25, and the third gear is defined by engagement of the clutches 25 and 34. In addition, the fourth gear is defined by engagement of the clutch 15 and the clutch 25, the fifth gear is defined by engagement of the clutches 15 and 34, the sixth gear is defined by engagement of the clutch 15 and the clutch 46, and the seventh gear is defined by engagement of the brake 04 and the clutch 15. As can be seen in the schematic shifting diagram of FIG. 3, the reverse gear is defined by engagement of the brake 03 and the clutch 46. It is also possible to realize the third gear by engaging the clutches 34 and 46 or 25 and 46.

Two additional reverse gears can be realized in the exemplary embodiment according to FIG. 5 by engaging the shifting elements 03 and 45 or 04 and 45.

Figure 12:
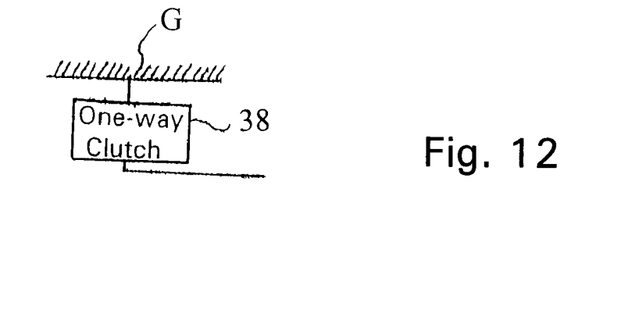
FIG. 12 is a diagrammatic view of an embodiment of the inventive multi-speed transmission having a one-way clutch.

According to the invention, as shown in FIG. 12, it is possible to provide additional one-way clutches 38 at each suitable point of the multi-speed transmission, for example between a shaft and the housing or in order to connect two shafts if required.

Figure 7:
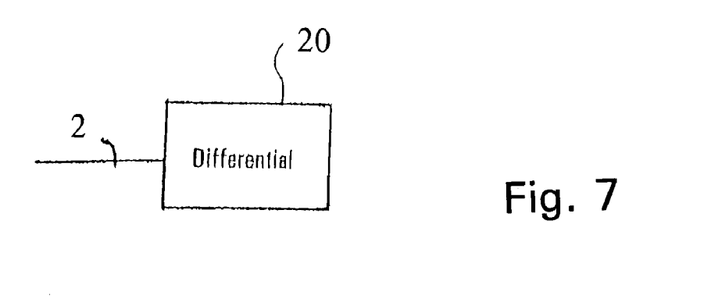
FIG. 7 is a diagrammatic view of an embodiment of the inventive multi-speed transmission having a differential.

An axle differential and/or a distributor differential 20 can be arranged at the input side or at the output side according to the invention and shown in FIG. 7.

Figure 8:
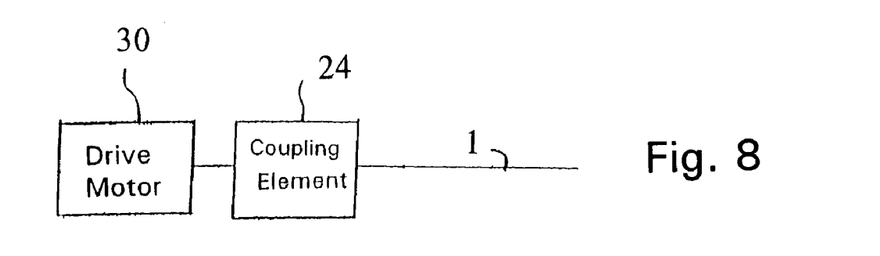
FIG. 8 is a diagrammatic view of an embodiment of the inventive multi-speed transmission with a coupling element and a drive motor.
Figure 9:
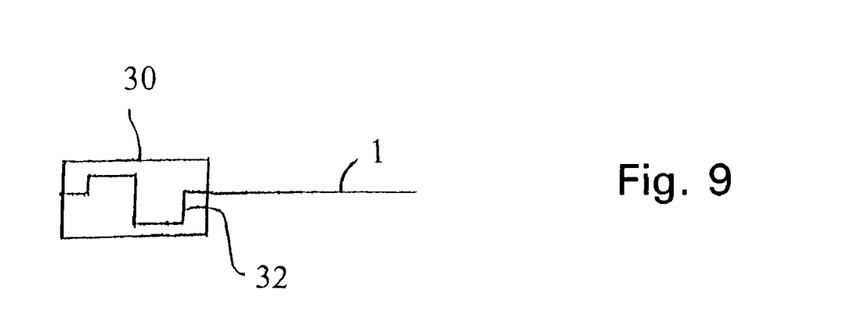
FIG. 9 is a diagrammatic view of an embodiment of the inventive multi-speed transmission with a crankshaft of the drive motor fixed to an input shaft of the multi-speed transmission.
Figure 16:
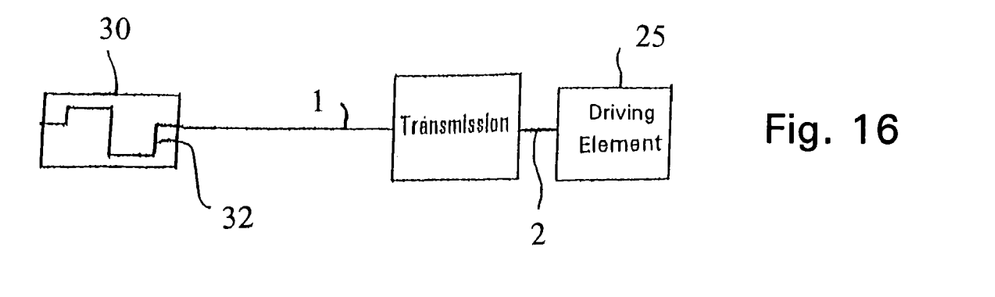
FIG. 16 is a diagrammatic view of another embodiment of the inventive multi-speed transmission with the crankshaft of the drive motor fixed to the input shaft of the multi-speed transmission and the coupling element located behind the multi-speed transmission.

Within the scope of an advantageous further development, as shown in FIG. 8, the input shaft 1 can be separated, if required, from a drive motor 30 by means of a coupling element 24, with a hydrodynamic converter, a hydraulic clutch, a dry starting clutch, a wet starting clutch, a magnetic powder clutch, or a centrifugal clutch being used as the coupling element. It is also feasible, as shown in FIG. 16, to arrange such a driving element 25 in the power flow direction behind the transmission, in which case the input shaft 1 is permanently connected to the crankshaft of the drive motor 30 and shown in FIG. 9.

Figure 10:
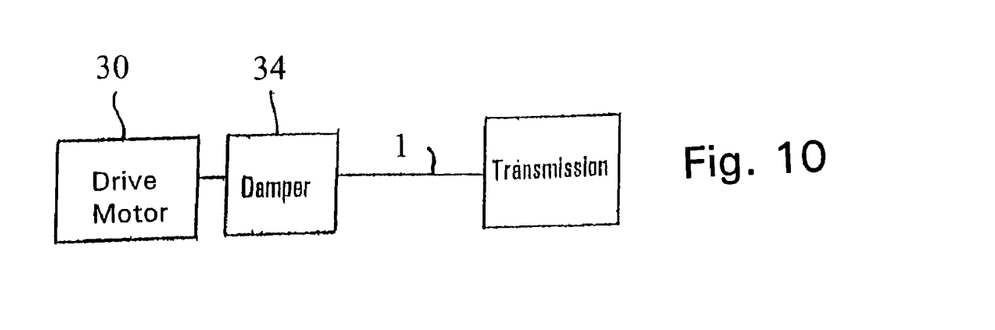
FIG. 10 is a diagrammatic view of an embodiment of the inventive multi-speed transmission having the drive motor communicating with a damper.

The multi-speed transmission according to the invention and shown in FIG. 10 also enables the arrangement of a torsional vibration damper 34, to be provided between the drive motor 30 and the transmission.

Figure 11:
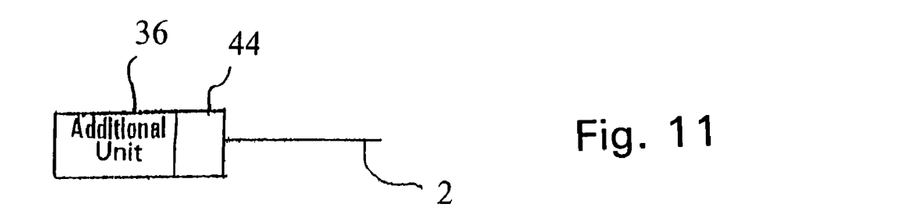
FIG. 11 is a diagrammatic view of an embodiment of the inventive multi-speed transmission with a power take-off for driving an additional unit.
Figure 14:
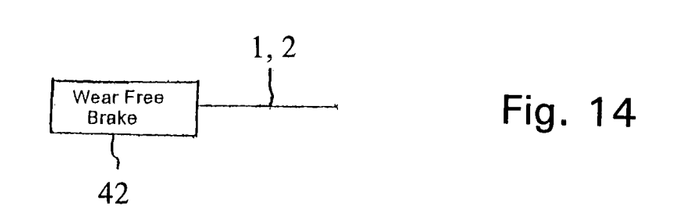
FIG. 14 is a diagrammatic view of a preferred design of the inventive multi-speed transmission having a wear free brake.
Figure 15:
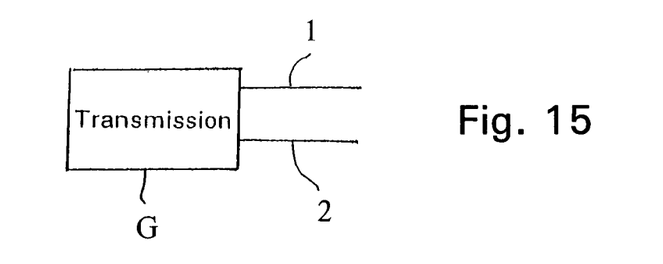
FIG. 15 is a diagrammatic view of a further embodiment of the invention with the input and the output being provided on the same side of the multi-speed transmission housing.

Within the scope a further embodiment, shown in FIG. 14 of the invention, a wear-free brake 42, for example a hydraulic or electric retarder or the like, can be arranged on each shaft, preferably on the input shaft 1 or the output shaft 2, which is of particular importance for use in commercial vehicles. A power take-off 44 can also be provided, as shown in FIG. 11, in order to drive additional units 36 on each shaft, preferably on the input shaft 1 or the output shaft 2. Additionally, as shown in FIG. 15, the input and the output are provided on the same side of the housing G.

The shifting elements that are used can be configured as power shifting clutches or power shifting brakes. Non-positive clutches or non-positive brakes, such as, for example, disk clutches, band brakes and/or cone clutches, can especially be used. Moreover, positive brakes and/or positive clutches, such as, for example, synchronizing mechanisms or claw clutches, can also be used as shifting elements.

Figure 13:
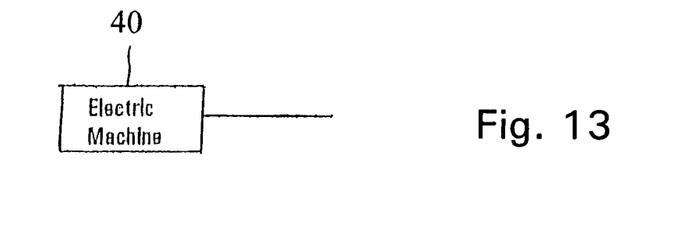
FIG. 13 is a diagrammatic view of an embodiment of the inventive multi-speed transmission with an electric machine.

Another advantage of the multi-speed transmission presented herein in FIG. 13, is that an electric machine 40 can be mounted as a generator and/or as an additional drive unit on each shaft.

Any embodiment configuration, in particular any spatial arrangement of the planetary gear sets and the shifting elements per se as well as in relation to one another, is understood to be covered under the protective scope of the claims, as long as it is practical from the technical point of view and does not influence the function of the transmission as disclosed in the claims, even if these embodiments are not explicitly depicted in the Figs. or described in the disclosure.

REFERENCE SYMBOLS 0 shaft
1 shaft
2 shaft
3 shaft
4 shaft
5 shaft
6 shaft
03 brake
04 brake
15 clutch
23 clutch
25 clutch
34 clutch
45 clutch
46 clutch
P1 planetary gear set
P2 planetary gear set
P3 planetary gear set
An input
Ab output
i gear ratio
phi progression ratio
G housing

The invention claimed is:

1. A multi-speed automatic transmission of a planetary design for a motor vehicle, the transmission comprising:
   an input shaft (1) and an output shaft (2) are arranged in a housing (G);
   first, second and third planetary gear sets (P1, P2, P3), and each of the first, the second and the third planetary gear sets (P1, P2, P3) comprising a sun gear, a carrier, and a ring gear;
   at least, third, fourth, fifth, and sixth rotatable shafts (3, 4, 5, 6) as well as at least six shifting elements (03, 04, 15, 23, 25, 34, 45, 46), comprising first and second brakes (03, 04) and first, second, third, fourth clutches (15, 23, 25, 34, 45, 46), whose selective engagement creates different gear ratios between the input shaft (1) and the output shaft (2) so that at least seven forward gears and one reverse gear can be implemented;
   wherein the input shaft (1) is permanently connected to the ring gear of the first planetary set (P1) and is detachably connected, via the first clutch (15), to the fifth shaft (5);
   the fifth shaft (5) is permanently connected to the carrier of the third planetary set (P3) and is detachably connected, via the third clutch (25), to the output shaft (2);
   the output shaft (2) is permanently connected to the ring gear of the second planetary set (P2);
   the third shaft (3) is permanently connected to the ring gear of the third planetary set (P3) and the carrier of the second planetary set (P2) and is detachably coupled to the housing (G), via the first brake (03);
   the fourth shaft (4) is permanently connected to the sun gear of the second planetary set (P2), and is detachably connected to the housing (G), via the second brake (04), and to the fourth shaft (6), via the sixth clutch (46);
   the sixth shaft (6) is permanently connected to the carrier of the first planetary set (P1) and the sun gear of the third planetary set (P3); and
   the sun gear of the first planetary set (P1) is connected to the housing (G); and one of:
      the output shaft (2) is detachably connected, via the second clutch (23), to the third shaft (3),
      the second shaft (5) is detachably connected, via the fifth clutch (45), to the fourth shaft (4), and
      the third shaft (3) is detachably connected, via the second clutch (34), to the fourth shaft (4).

2. The multi-speed transmission of claim 1, wherein the first planetary gear set (P1), the second planetary gear set (P2) and the third planetary gear set (P3) are arranged in an axial direction in the sequential order of:
   the first planetary gear set (P1), the second planetary gear set (P2) and the third planetary gear set (P3).

3. The multi-speed transmission of claim 1, wherein the first planetary gear set (P1), the second planetary gear set (P2) and the third planetary gear set (P3) are negative planetary gear sets.

4. The multi-speed transmission of claim 1, wherein viewed in an axial direction, the second clutch (23) and the third clutch (25) are arranged in the sequential order of:
   the second clutch (23) and the third clutch (25).

5. The multi-speed transmission of claim 1, wherein the second clutch (23) and the third clutch (25) are disk clutches which have a common outer disk carrier.

6. The multi-speed transmission of claim 1, wherein the at least seven forward gears are implemented with one of the following configurations:

- if the output shaft (2) is detachably connected, via the second clutch (23), to the third shaft (3), then first gear results from engagement of the first brake (03) and the third clutch (25), second gear results from engagement of the second brake (04) and the third clutch (25), third gear results from one of: (a) engagement of the third clutch (25) and the fourth clutch (46), (b) engagement of the second clutch (23) and the fourth clutch (46) and (c) engagement of the second clutch (23) and the third clutch (25), fourth gear results from engagement of the first clutch (15) and the third clutch (25), fifth gear results from engagement of the first clutch (15) and the second clutch (23), sixth gear results from engagement of the fourth clutch (46) and the first clutch (15), and seventh gear results from engagement of the second brake (04) and the first clutch (15);
- if the second shaft (5) is detachably connected, via the fifth clutch (45), to the fourth shaft (4), then the first gear results from engagement of the first brake (03) and the third clutch (25), the second gear results from engagement of the second brake (04) and the third clutch (25), the third gear results from one of: (a) engagement of the third clutch (25) and the second clutch (45), (b) engagement of the third clutch (25) and the fourth clutch (46), and (c) engagement of the second clutch (45) and the fourth clutch (46), the fourth gear results from engagement of the first clutch (15) and the third clutch (25), the second gear results from engagement of the first clutch (15) and the fifth clutch (45), the fourth gear results from engagement of the sixth clutch (46) and the first clutch (15), and the seventh gear results from engagement of the second brake (04) and the first clutch (15); and
- if the third shaft (3) is detachably connected, via the second clutch (34), to the fourth shaft (4), then the first gear results from engagement of the first brake (03) and the third clutch (25), the second gear results from engagement of the second brake (04) and the first clutch (15), the third gear results from one of: (a) engagement of the third clutch (25) and the second clutch (34), (b) engagement of the second clutch (34) and the fourth clutch (46), and (c) engagement of the third clutch (25) and the fourth clutch (46), the fourth gear results from engagement of the first clutch (15) and the third clutch (25), the fifth gear results from engagement of the first clutch (15) and the second clutch (34), the fourth gear results from engagement of the sixth clutch (46) and the first clutch (15), and the seventh gear results from engagement of the second brake (04) and the first clutch (15).

7. The multi-speed transmission of claim 1, wherein the reverse gear results from engagement of the first brake (03) and the fourth clutch (46), and if the third shaft (3) is detachably connected, via the second clutch (34), to the fourth shaft (4), an additional reverse gear results from one of: (a) engagement of the first brake (03) and the second clutch (45) and (b) engagement of the second brake (04) and the second clutch (45).

8. The multi-speed transmission of claim 1, wherein at least one one-way clutch is located within the transmission.

9. The multi-speed transmission of claim 8, wherein the at least one one-way clutch is located between the input shaft (1), the output shaft (2), the third shaft (3), the fourth shaft (4), the fifth shaft (5) and the sixth shaft (6) and the housing (G).

10. The multi-speed transmission of claim 1, wherein an input and an output of the transmission are located on a common side of the housing (G).

11. The multi-speed transmission of claim 1, wherein at least one of an axle differential and a distributor differential is located on one of the input shaft (1) and the output shaft (2).

12. The multi-speed transmission of claim 1, wherein a coupling element facilitates separation of the input shaft (1) from a drive motor.

13. The multi-speed transmission of claim 12, wherein the coupling element is one of a hydrodynamic converter, a hydraulic clutch, a dry starting clutch, a wet starting clutch, a magnetic powder clutch, and a centrifugal clutch.

14. The multi-speed transmission of claim 1, wherein an external driving element is located downstream of the transmission, in a direction of power flow, the input shaft (1) is firmly connected to a crankshaft of a drive motor.

15. The multi-speed transmission of claim 1, wherein the vehicle is started via one of the six shifting elements (03) of the transmission, and the input shaft (1) is permanently connected to a crankshaft of a drive motor.

16. The multi-speed transmission of claim 1, wherein a torsional vibration damper is located between a drive motor and the transmission.

17. The multi-speed transmission of claim 1, wherein a wear-free brake is arranged on at least one of the input shaft (1), the output shaft (2), the third shaft (3), the fourth shaft (4), the fifth shaft (5) and the sixth shaft (6).

18. The multi-speed transmission of claim 1, wherein a power take-off is arranged on at least one of the input shaft (1), the output shaft (2), the third shaft (3), the fourth shaft (4), the fifth shaft (5) and the sixth shaft (6) for driving additional units.

19. The multi-speed transmission of claim 18, wherein the power take-off is located on one of the input shaft (1) and the output shaft (2).

20. The multi-speed transmission of claim 1, wherein each of the at least six shifting elements (03, 04, 15, 23, 25, 34, 45, 46) is one of a power-shift clutch and a power shift brake.

21. The multi-speed transmission of claim 20, wherein each of the at least six shifting elements (03, 04, 15, 23, 25, 34, 45, 46) is one of a disk clutch, a band brake, and a cone clutch.

22. The multi-speed transmission of claim 1, wherein each of the at least six shifting elements (03, 04, 15, 23, 25, 34, 45, 46) is one of a positive brake and a positive clutch.

23. The multi-speed transmission of claim 1, wherein an electric machine is arranged on at least one of the input shaft (1), the output shaft (2), the third shaft (3), the fourth shaft (4), the fifth shaft (5) and the sixth shaft (6) as one of a generator and an additional drive unit.

* * * * *